(12) United States Patent
Boss et al.

(10) Patent No.: US 8,062,164 B2
(45) Date of Patent: Nov. 22, 2011

(54) MULTI-STAGE GEARBOX

(75) Inventors: Ralf Boss, Kressbronn (DE); Gerhard Gumpoltsberger, Friedrichshafen (DE); Hans-Peter Freudenreich, Griesingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 351 days.

(21) Appl. No.: 12/518,950

(22) PCT Filed: Dec. 6, 2007

(86) PCT No.: PCT/EP2007/063443
§ 371 (c)(1),
(2), (4) Date: Jul. 16, 2009

(87) PCT Pub. No.: WO2008/074646
PCT Pub. Date: Jun. 26, 2008

(65) Prior Publication Data
US 2010/0048343 A1  Feb. 25, 2010

(30) Foreign Application Priority Data
Dec. 19, 2006 (DE) .......... 10 2006 059 912

(51) Int. Cl.
*F16H 3/62* (2006.01)
(52) U.S. Cl. .................. 475/275; 475/286
(58) Field of Classification Search .......... 475/275, 475/286, 287
See application file for complete search history.

(56) References Cited

U.S. PATENT DOCUMENTS

| | | | |
|---|---|---|---|
| 6,139,463 A | 10/2000 | Kasuya et al. | |
| 6,558,287 B2 | 5/2003 | Hayabuchi et al. | |
| 6,572,507 B1 | 6/2003 | Korkmaz et al. | |
| 6,743,141 B2* | 6/2004 | Bucknor et al. | 475/276 |
| 6,860,831 B2 | 3/2005 | Ziemer | |
| 2003/0162629 A1 | 8/2003 | Bucknor et al. | |
| 2004/0097324 A1 | 5/2004 | Ziemer | |
| 2005/0215380 A1 | 9/2005 | Bucknor et al. | |
| 2005/0255959 A1* | 11/2005 | Tiesler et al. | 475/284 |
| 2005/0272554 A1 | 12/2005 | Raghavan et al. | |
| 2006/0040783 A1 | 2/2006 | Raghavan et al. | |
| 2006/0046892 A1* | 3/2006 | Bucknor et al. | 475/282 |
| 2006/0052208 A1* | 3/2006 | Park | 475/275 |

FOREIGN PATENT DOCUMENTS
DE 2936969 4/1981
(Continued)

*Primary Examiner* — Edwin A Young
(74) *Attorney, Agent, or Firm* — Davis & Bujold, P.L.L.C.

(57) ABSTRACT

Multi-stage transmission having six or seven forward gears and three reverse gears comprises three planetary gear sets (P1, P2, P3), six rotatable shafts (1, 2, 3, 4, 5, 6), as well as six shifting elements (03, 04, 13, 14, 15, 35, 36, 46), whereby the shaft (1) is permanently connected to input element (An) and to the sun gear of the second planetary gear set (P2), the shaft (2) is permanently connected to the output element (Ab) and the ring gear of the third planetary gear set (P3), the shaft (3) is permanently connected to the ring gear of the second planetary gear set (P2), the shaft (4) is permanently connected to the web of the third planetary gear set (P3), the shaft (5) is permanently connected to the ring gear of the first planetary gear set (P1), to the web of the second planetary gear set (P2), and to the sun gear of the third planetary gear set (P3), the shaft (6) is permanently connected to the web of the first planetary gear set (P1), whereby the sun gear of the first planetary gear set (P1) is connected torque-proof to a transmission housing (G), whereby the shafts (3), (4) can be connected via a brake (03, 04) to a transmission housing (G), and whereby the clutch (14) detachably connects the shaft (1) to the shaft (4), the clutch (36) detachably connects the shaft (3) to the shaft (6), the clutch (46) detachably connects the shaft (4) to the shaft (6), and whereby a further clutch (35, 13, 15) is provided, via which the shaft (3) is detachably connected to the shaft (5), the shaft (1) is detachably connected to the shaft (3), or the shaft (1) is detachably connected to the shaft (5).

21 Claims, 6 Drawing Sheets

FOREIGN PATENT DOCUMENTS

| | | |
|---|---|---|
| DE | 19912480 | 9/2000 |
| DE | 19949507 | 4/2001 |
| DE | 10162874 | 12/2001 |
| DE | 10115983 | 10/2002 |
| DE | 10115987 | 10/2002 |
| DE | 10213820 | 10/2002 |
| DE | 102004040902 | 3/2006 |
| EP | 0434525 | 6/1991 |

* cited by examiner

|  | B03 | B04 | K35 | K14 | K36 | K46 | i | phi |
|---|---|---|---|---|---|---|---|---|
| 1. Gear | X |  |  |  |  | X | 4.941 | 1.817 |
| 2. Gear |  |  |  |  | X | X | 2.719 | 1.485 |
| 3. Gear |  |  | X |  |  | X | 1.830 | 1.400 |
| 4. Gear |  |  |  | X |  | X | 1.308 | 1.308 |
| 5. Gear |  |  | X | X |  |  | 1.000 | 1.192 |
| 6. Gear |  |  |  | X | X |  | 0.839 | 5.891 |
| R1. Gear | X | X |  |  |  |  | -4.589 | -0.929 |
| R2. Gear |  | X |  |  | X |  | -2.525 | -0.929 |
| R3. Gear |  | X | X |  |  |  | -1.700 | -0.929 |

Fig. 2

|  | B03 | B04 | K35 | K14 | K36 | K46 | i | phi |
|---|---|---|---|---|---|---|---|---|
| 1. Gear | X |  |  |  |  | X | 4 941 | 1 817 |
| 2. Gear |  |  |  |  | X | X | 2 719 | 1 485 |
| 3. Gear |  |  | X |  |  | X | 1 830 | 1 400 |
| 4. Gear |  |  |  | X |  | X | 1 308 | 1 308 |
| 5. Gear |  |  | X | X |  |  | 1 000 | 1 192 |
| 6. Gear |  |  |  | X | X |  | 0 839 | 1 149 |
| 7. Gear | X |  |  | X |  |  | 0 730 | 6 771 |
| R1. Gear | X | X |  |  |  |  | -4 589 | -0 929 |
| R2. Gear |  | X |  |  | X |  | -2 525 | -0 929 |
| R3. Gear |  | X | X |  |  |  | -1 700 | -0 929 |

MULTI-STAGE GEARBOX

This application is a National stage of PCT/US2007/063443 filed Dec. 6, 2007 which claims priority from German application no. 10 2006 059 912.8 filed Dec. 19, 2006.

FIELD OF INVENTION

The present invention relates to a multi-stage transmission in a planetary design, particularly an automatic transmission for a motor vehicle, according to the preamble of claim 1.

BACKGROUND ON INVENTION

According to the state of the art, automatic transmissions, particularly for motor vehicles, comprise planetary gear sets, which are shifted by means of friction and/or control elements, such as clutches and brakes, which are typically connected to a starting element subject to a slip effect and optionally provided with a lock-up clutch, for example, a hydrodynamic torque converter or a fluid clutch.

A transmission of this type is disclosed in EP 0 434 525 A1. It is essentially comprised of an input shaft and an output shaft, which are arranged parallel to one another, a double planetary gear set arranged concentrically to the output shaft, and five shifting elements in the form of three clutches and two brakes whose selective engagement in pairs respectively defines the different gear ratios between the input shaft and output shaft. In this case, the transmission has a front-mounted gear set and two power paths so that by selective meshing of pairs the five shifting elements, six forward gears are accomplished.

In this regard, two clutches are required in the first power path for the transmission of the torque of the front-mounted gear set to the two elements of the double planetary gear set. They are essentially arranged in the direction of the force flow behind the front-mounted gear set toward the double planetary gear set. Another clutch is provided in the second power path that detachably connects it with a further element of the double planetary gear set. In this case, the clutches are connected, such that the inner disk carrier forms the output element.

Furthermore, a compact multi-stage transmission of planetary design, in particular for a motor vehicle, is known from document U.S. Pat. No. 6,139,463, which has two planetary gear sets and a front-mounted gear set as well as three clutches and two brakes. In this known multi-stage transmission, two clutches C-1 and C-3 are provided in a first power path for transmitting the torque from the front-mounted gear set to both planetary gear sets. The outer disk carrier and/or cylinder and/or piston and the pressure equalization side of the clutch C-3 is connected to a first brake B-1. In addition, the inner disk carrier of the third clutch C-3 is connected to the cylinder and/or piston and pressure equalization side of the first clutch C-1, whereby the inner disk carrier of the first clutch C-1 is positioned on the output side and connected to a sun gear of the third planetary gear set.

Furthermore, a multi-stage transmission is known from DE 199 49 507 A1 by the applicant in which two non-shiftable front-mounted gear sets are provided on the input shaft, which on the output side generate two rotational speeds that, apart from the rotational speed of the input shaft, can be selectively shifted to a shiftable double planetary gear set acting on the output shaft by selectively engaging the shifting elements which were used, such that only one shifting element must be engaged or disengaged for changing from one gear to the next higher or lower gear of the two just actuated shifting elements.

From DE 199 12 480 A1, an automatic motor vehicle transmission is known with three single-carrier planetary gear sets, as well as three brakes and two clutches for shifting six forward gears and one reverse gear, and an input shaft and an output shaft. The automatically shiftable motor vehicle transmission is configured such that the input shaft is directly connected to the sun gear of the second planetary gear set and that the input shaft can be connected, via the first clutch, to the sun gear of the first planetary gear set and/or, via the second clutch, to the carrier of the first planetary gear set. Additionally or alternatively, the sun gear of the first planetary gear set can be connected, via the first brake, to the transmission housing, and/or the carrier of the first planetary gear set can be connected, via the second brake, to the housing, and/or connected to the sun gear of the third planetary gear set, via the third brake to the housing.

Moreover, from DE 102 13 820 A1, a multi-speed transmission is known, comprising a first input path T1 of a first transmission ratio, an input path T2 that has a higher transmission ratio than this input path T1, a planetary gear set with four elements, whereby the four elements are a first element, a second element, a third element and a fourth element in the sequence of the elements in a rotational speed diagram, a clutch C-2 that transfers the rotation from the input path T2 to the first element S3, a clutch C-1 that transfers the rotation from the input path T2 to the fourth element S2, a clutch C-4 that transfers the rotation from the input path T1 to the first element, a clutch C-3 that transfers the rotation from the input path T1 to the second element C3, a brake B-1 that generates the mesh of the second element, a brake B-2 that generates the mesh of the second element, and an output element that is coupled to the third element R3.

In the context of DE 101 15 983 A1 by the applicant, a multi-stage transmission is described that has an input shaft that is connected to a front-mounted gear set, an output shaft that is connected to a rear-mounted gear set, and a maximum of seven shifting elements by means of whose selective shifting at least eight forward gears can be shifted without group shifting. The front-mounted gear set is formed by a front-mounted planetary gear set or a maximum of two non-shiftable front-mounted planetary gear sets coupled to the first front-mounted planetary gear set, whereby the rear-mounted gear set is configured as a double-carrier four-shaft transmission with two shiftable rear-mounted planetary gear sets and four free shafts. The first free shaft of this double-carrier four-shaft transmission is connected to the first shifting element, the second free shaft with the second and third shifting elements, the third free shaft with the fourth and fifth shifting elements, and the fourth free shaft is connected to the output shaft. The invention additionally proposes connecting the third free shaft or the first free shaft of the rear-mounted gear set to a sixth shifting element for a multi-stage transmission with a total of six shifting elements. The invention also proposes connecting the third free shaft to a sixth shifting element D' and additionally the first free shaft to a seventh shifting element for a multi-stage transmission with a total of seven shifting elements.

A multi-stage transmission with at least seven gears is described within the scope of DE 101 15 987 by the applicant. Apart from the input shaft and the output shaft, this transmission consists of a non-shiftable, front-mounted gear set and a shiftable, rear-mounted gear set in the form of a double-carrier, four-shaft transmission. The front-mounted gear set consists of a first planetary gear set which, apart from the rotational input speed of the input shaft, offers a second rotational speed that can be selectively shifted to a rear-mounted gear set. The rear-mounted gear set consists of two shiftable planetary gear sets that can shift at least seven gears with the six shifting elements forming two power paths. In this case, group shifting is advantageously prevented with each shifting operation. A 9-gear, multi-stage transmission is further known from DE 29 36 969 comprising eight shifting elements and four gear sets.

Automatically shiftable vehicle transmissions of a planetary design have in general been described in the state of the art on many occasions and are subject to continuous development and improvements. Thus, these transmissions are supposed to require low design and construction costs, in particular, a small number of shifting elements, and prevent double shifts during sequential gear changes, so that only one shifting element at a time is changed when shifting in defined gear groups.

Previous planetary gear transmissions normally have only one reverse gear, whereas planetary gear transmissions are also known that have additional reverse gears that can either be shifted with the shifting elements available in the planetary gear transmission or implemented by means of an additional changing set. Thus, the disadvantage of the known planetary gear transmissions is either the insufficient number and inadequate transmission ratio of the reverse gears or the design and construction costs required for implementing the reverse gears.

SUMMARY OF INVENTION

The basic object of the present invention is to propose a multi-stage transmission of the type mentioned above that has at least six forward gears and at least three reverse gears with an adequate transmission ratio in which the design and construction costs and the size and/or weight are optimized and, in addition, the degree of efficiency with regard to drag and gearing losses is improved. Moreover, the torque acting on the shifting elements and planetary gear sets should lessen with the multi-stage transmission according to the present invention, and the speeds of the shafts, shifting elements and planetary gear sets should likewise be as low as possible. In particular, the transmission according to the present invention should be suitable for installation in commercial vehicles and machines, in order to allow sufficient forward traction force and speed as well as sufficient reverse traction force and speed.

Thus, a multi-stage transmission a planetary design according to the present invention that exhibits an input element and an output element that are arranged in a housing. Furthermore, at least three planetary gear sets are provided, hereinafter designated as first, second and third planetary gear sets, at least six rotatable shafts, hereinafter designated as first, second, third, fourth, fifth and sixth shafts, as well as at least six shifting elements, comprising brakes and clutches whose selective engagement generates different transmission ratios between the input element and output element, so that preferably six or seven forward gears and three reverse gears can be implemented.

According to the present invention, it is provided that in the multi-stage transmission the first shaft is rotationally fixed to the input element and to the sun gear of the second planetary gear set, whereby the second shaft is rotationally fixed to the output element and ring gear of the third planetary gear set, the third shaft is rotationally fixed to the ring gear of the second planetary gear set, and whereby the fourth shaft is rotationally fixed to the carrier of the third planetary gear set.

Furthermore, the fifth shaft is rotationally fixed to the gear ring of the first planetary gear set, to the carrier of the second planetary gear set, and to the sun gear of the third planetary gear set, whereby the sixth shaft is permanently connected to the carrier of the first planetary gear set. According to the present invention, the sun gear of the first planetary gear set is connected in a rotationally fixed manner, via a further shaft, to a transmission housing.

In this case, the third and fourth shaft can each be connected via a brake to a transmission housing. It is further provided that a clutch detachably connects the first shaft to the fourth shaft, that another clutch detachably connects the third shaft to the sixth shaft, that another clutch detachably connects the fourth shaft to the sixth shaft, and that by actuating another clutch which, for example, detachably connects the third shaft to the fifth shaft, the planetary gear set is blocked.

By means of the embodiment of the multi-stage transmission according to the present invention, suitable transmission ratios are especially accomplished for commercial vehicles and machines. Furthermore, the design and construction costs are considerably reduced with the multi-stage transmission according to the present invention, as a result of the small number of shifting elements, preferably two brakes and four clutches. With the multi-stage transmission according to the present invention, it is advantageously possible to start up with a hydrodynamic converter, a hydrodynamic clutch, an external starting clutch or also with other adequate external starting elements. It is also conceivable to allow a start-up procedure, via a starting element incorporated in the transmission. A starting element that is actuated in the first forward gear and in the first reverse gear is preferably suitable.

With the multi-stage transmission according to the present invention a good degree of efficiency is further achieved in the main gears with respect to drag and gearing losses.

Furthermore, there is less torque in the shifting elements and in the planetary gear sets of the multi-stage transmission, which advantageously results in reduced wear and tear. As a result of less torque, correspondingly smaller dimensions are possible, whereby the required installation space and corresponding costs are reduced. Moreover, the speeds of the shafts, shifting elements and planetary gear sets are also reduced.

In addition, the multi-stage transmission according to the present invention is designed so that it is adaptable to different power train embodiments in the direction of the force flow and also from the spatial perspective.

BRIEF DESCRIPTION OF DRAWINGS

The present invention will be explained in more detail hereinafter by means of the exemplary attached figures. Which show.

DETAILED DESCRIPTION OF DRAWINGS

Figure 1:
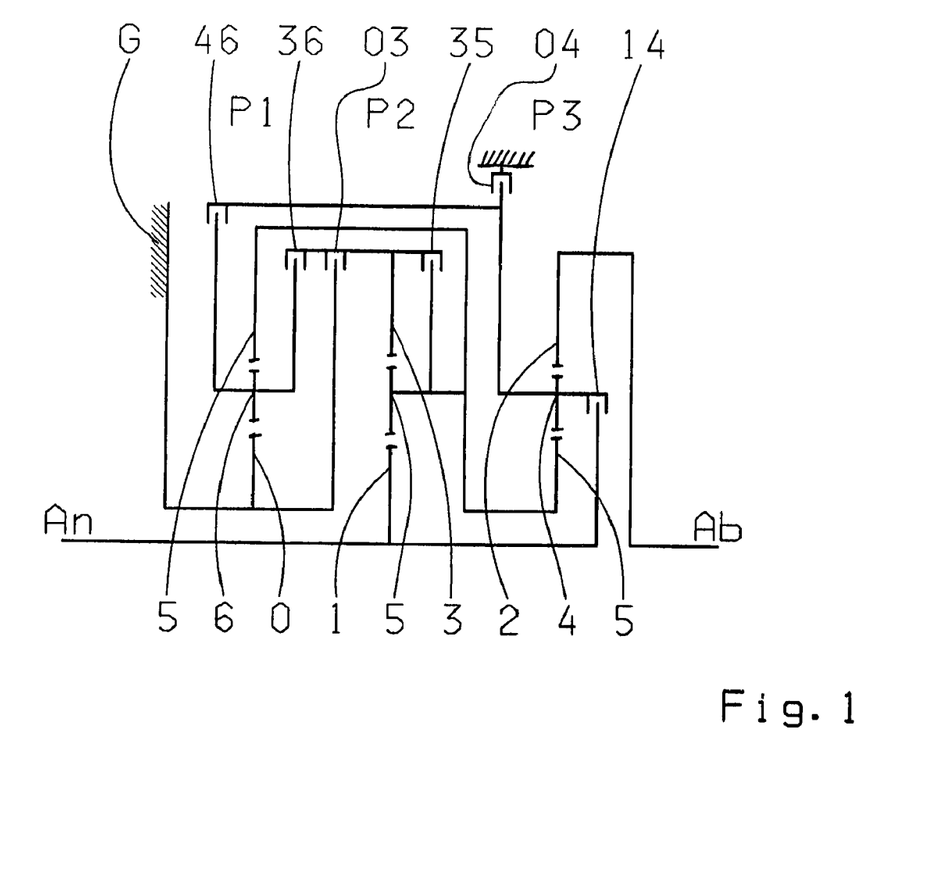
FIG. 1 A schematic view of a first preferred embodiment of the multi-stage transmission according to the present invention.
Figure 1A:
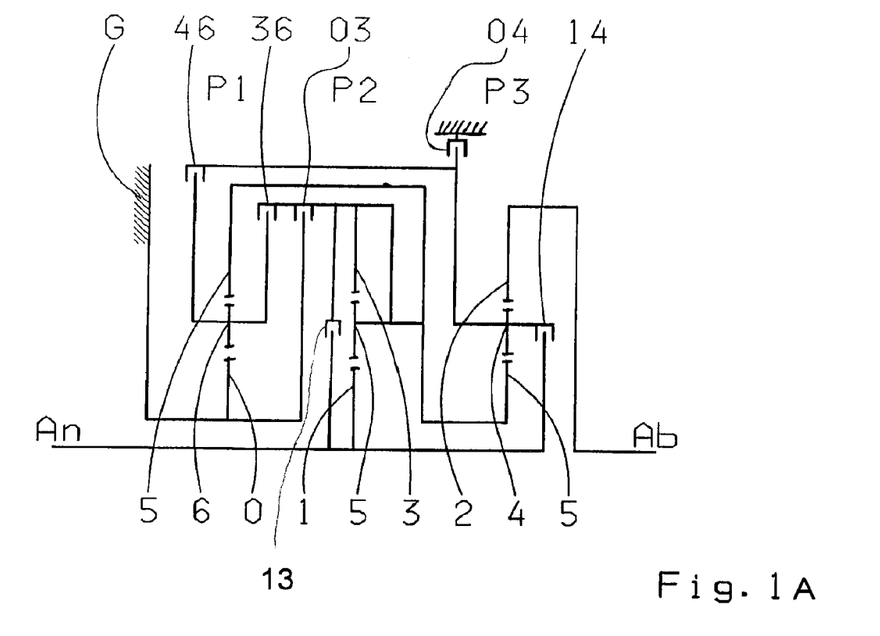
FIG. 1A A schematic view of a variant of the first preferred embodiment of the multi-stage transmission according to the present invention.
Figure 1B:
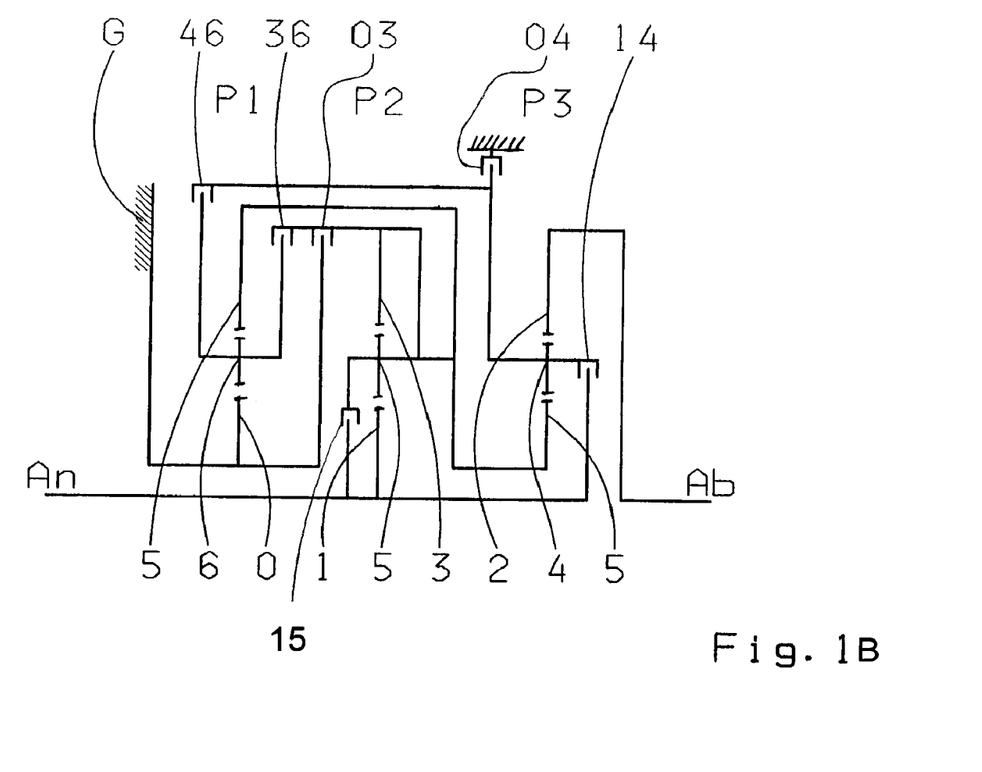
FIG. 1B A schematic view of another variant of the first preferred embodiment of the multi-stage transmission according to the present invention FIG. 2 An exemplary shift pattern for the multi-stage transmission according to the present invention shown in FIG. 1.

FIG. 1 shows a multi-stage transmission according to the present invention with an input shaft An and an output shaft Ab, which are arranged in a housing G. Three planetary gear sets P1, P2, P3 are provided, which preferably are configured as minus planetary gear sets and arranged in the sequentially in the axial direction P1, P2, P3.

As is apparent from FIG. 1, only six shifting elements, namely two brakes 03, 04 and four clutches 14, 35, 36 and 46 are provided. Selective shifting of these shifting elements can preferably implement six or seven forward gears and three reverse gears. The multi-stage transmission according to the present invention has a total of six rotatable shafts, namely shafts 1, 2, 3, 4, 5, and 6.

According to the present invention, it is provided that in the multi-stage transmission according to FIG. 1, the shaft 1 is permanently connected to the input shaft An and to the sun gear of the second planetary gear set P2, whereby shaft 2 is permanently connected to the output shaft Ab and the ring gear of the third planetary gear set P3, the shaft 3 is permanently connected to the ring gear of the second planetary gear set P2, and whereby the shaft 4 is permanently connected to the web of the third planetary gear set P3. Furthermore, the shaft 5 is permanently connected to the ring gear of the first planetary gear set P1, to the carrier of the second planetary gear set P2, and to the sun gear of the third planetary gear set P3, whereby shaft 6 is permanently connected to the carrier of the first planetary gear set P1. As shown in FIG. 1, the sun gear of the first planetary gear set P1 is connected in a rotationally fixed manner via the shaft 0 to the transmission housing G.

As is apparent from FIG. 1, the shaft 3 can be connected to the transmission housing G via the brake 03, while the shaft 4 can likewise be connected to the transmission housing G via the brake 04. According to the present invention, it is further provided that the clutch 35 detachably connects the shaft 3 to the shaft 5, that the clutch 14 detachably connects the shaft 1 to the shaft 4, that the clutch 36 detachably connects the shaft 3 to the shaft 6, and that the clutch 46 detachably connects the shaft 4 to the shaft 6.

In the described exemplary embodiments, the outer disk carrier of the clutch 46 (in case it is configured as a multi-disk clutch) is configured above the shifting elements 36, 03 and 35 when viewed radially.

The spatial arrangement of the shifting elements can be arbitrary and is only limited by the dimensions and outer design, so that, depending on the constructive requirements, the actual arrangement of the elements may be considerably different from the arrangement shown.

Figure 2:
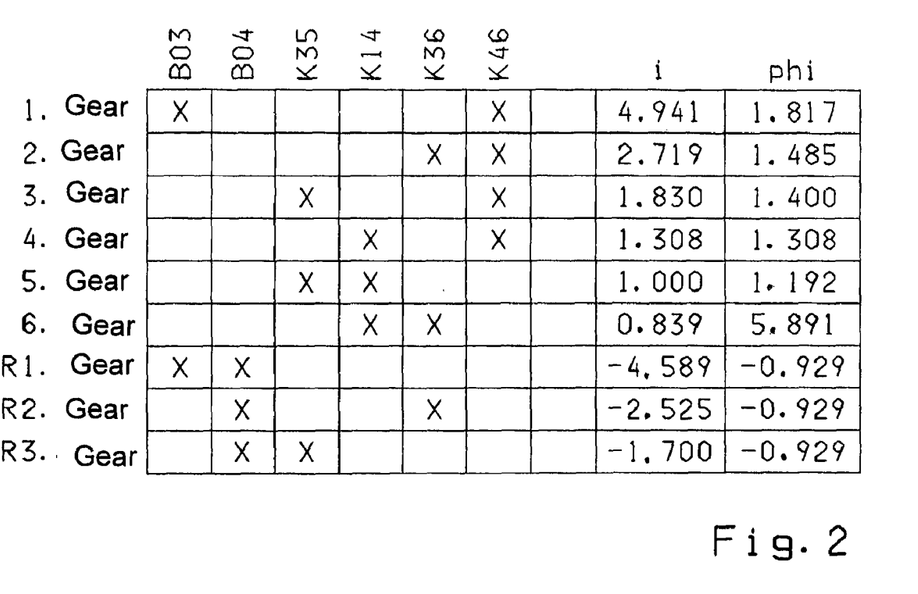

FIG. 2 shows an exemplary shift pattern of the multi-stage transmission according to the present invention shown in FIG. 1, by means of which six forward gears and three reverse gears can be implemented. Two shifting elements are engaged for each gear. The respective transmission ratios [i] of each gear ratio and the progressive ratios [phi] to be defined therefrom can be found by way of example in the shift pattern. Furthermore, the shift pattern shows that double shifting and/or group shifting are prevented with sequential shifting, since two adjacent gear ratios use one shifting element in common. In the shift pattern depicted, the fifth gear is configured as a direct gear.

According to the present invention, depending on the gear shift logic, different gear transitions can be accomplished with the same shift pattern, making custom-designed and/or vehicle-specific variations possible.

The first forward gear results from engaging the brake 03 and the clutch 46, the second gear from engaging the clutch 36 and the clutch 46, and the third gear results from engaging the clutch 35 and the clutch 46. Furthermore, the fourth gear results from engaging the clutches 14 and 46, the fifth gear from engaging the clutch 35 and the clutch 14, and the sixth gear from engaging the clutch 14 and the clutch 36. As is apparent from the shift pattern, the first reverse gear results from engaging the brake 03 and the brake 04, the second reverse gear from engaging the brake 04 and the clutch 36, and the third reverse gear results from engaging the brake 04 and the clutch 35.

Figure 3:
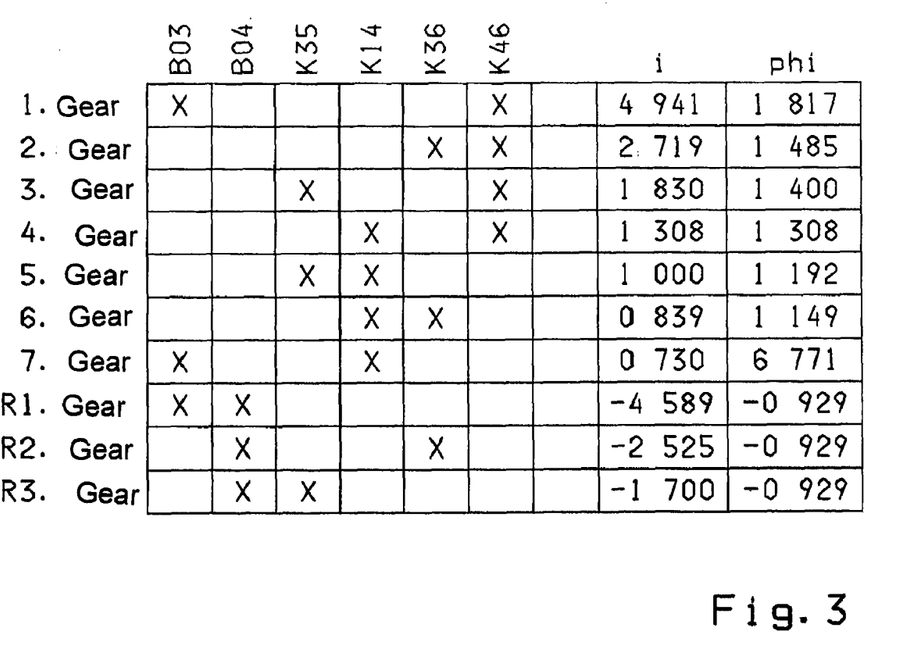
FIG. 3 A further exemplary shift pattern for the multi-stage transmission according to the present invention shown in FIG. 1.

According to the present invention, an additional forward gear, namely a seventh forward gear, can be implemented by engaging the brake 03 and the clutch 14, as exemplified in the shift pattern according to FIG. 3.

Within the framework of a further embodiment of the present invention, it is proposed that the clutch 35, which detachably connects the shafts 3 and 5 to one another is replaced by a clutch 13, which detachably connects the shafts 1 and 3 to one another. Alternatively, the clutch 35 can be replaced by a clutch 15, which detachably connects the shafts 1 and 5 to one another. The same effect, namely locking the second planetary gear set P2, is achieved by means of clutches 35, 13 and 15. The shift pattern corresponding to these embodiments differs from the shift pattern according to FIG. 2 and FIG. 3 in that the clutch 35 is replaced by the clutch 13 and/or 15.

Figure 4:
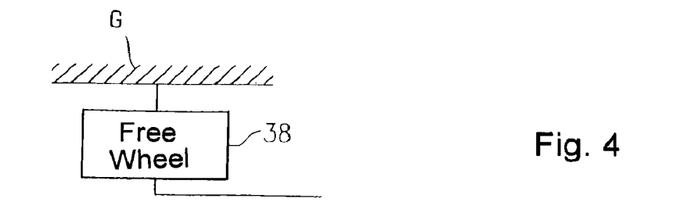
FIG. 4 A schematic view of the transmission according to FIG. 1 with a free wheel arranged between a housing and a shaft of the transmission.

According to the present invention, as shown in FIG. 4, it is possible to provide additional freewheel clutches 38 at each suitable point of the multi-stage transmission, for example, between a shaft and housing G or, if necessary, to connect two shafts.

Figure 5:
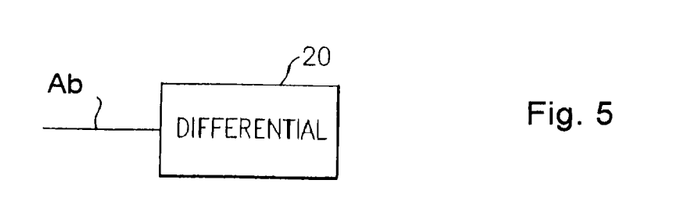
FIG. 5 A schematic view of the transmission according to FIG. 1 with a differential arranged on an output shaft of the transmission.

According to the present invention, as shown in FIG. 5, a differential and/or transfer differential 20 can be arranged on the input side or output side.

Figure 6:
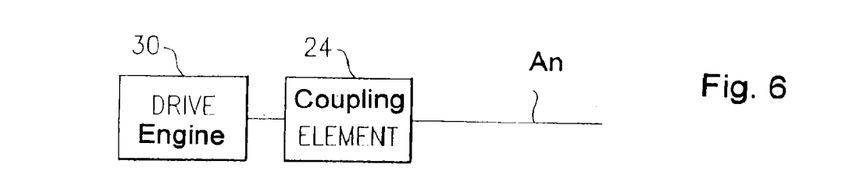
FIG. 6 A schematic view of the transmission according to FIG. 1 with an input shaft separated from a drive engine by a coupling element.
Figure 7:
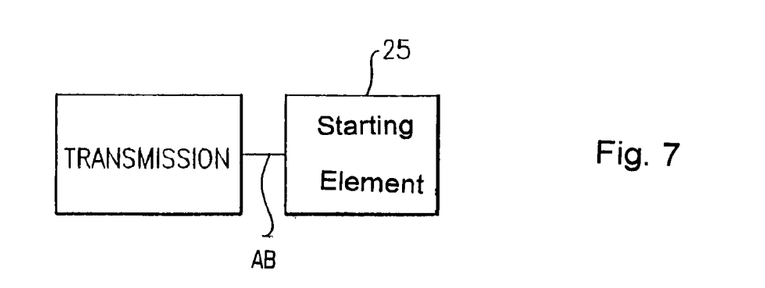
FIG. 7 A schematic view of the transmission according to FIG. 1 with a starting element arranged behind the transmission.
Figure 8:
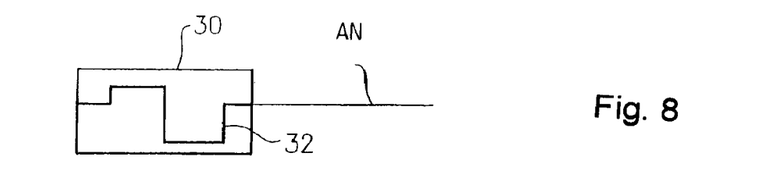
FIG. 8 A schematic view of the transmission according to FIG. 1 with an input shaft connected to a crankshaft of an engine.

In the context of an advantageous improvement, as shown in FIG. 6, the input shaft can be separated from a drive engine 30 by a starting element 24, if required, whereby a hydrodynamic converter, hydraulic clutch, dry starting clutch, wet starting clutch, magnetic powder clutch or centrifugal clutch can be used. It is also possible, as shown in FIG. 7, to arrange a starting element 24 of this type in the direction of the force flow behind the transmission, whereby, as shown in FIG. 8, the input shaft is permanently connected to the crankshaft 32 of the engine 30 in this case.

Figure 9:
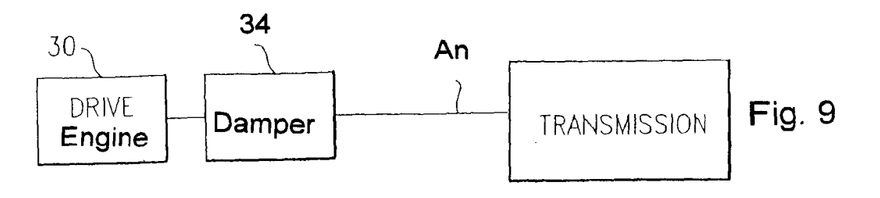
FIG. 9 A schematic view of the transmission according to FIG. 1 with a damper arranged between an engine and the transmission.

The multi-stage transmission according to the present invention, as shown in FIG. 9, also makes the arrangement of a torsion vibration damper 34 between the engine 30 and the transmission possible.

Figure 10:
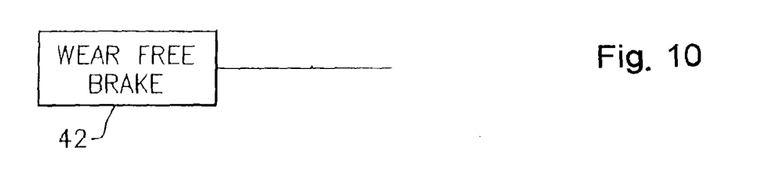
FIG. 10 A schematic view of the transmission according to FIG. 1 with a wear free brake arranged on a shaft.
Figure 11:
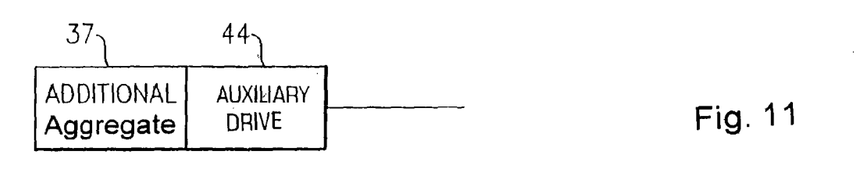
FIG. 11 A schematic view of the transmission according to FIG. 1 with an auxiliary drive arranged on a shaft driving an additional aggregate.

In the context of another, embodiment of the present invention, as shown in FIG. 10, a wear-free brake 42, e.g. a hydraulic or electric retarder or a similar device, can be arranged on the input shaft or output shaft, which is particularly important for the use in commercial vehicles. An auxiliary drive system 44 may be further provided, as shown in FIG. 11, preferably on the input shaft or output shaft, for driving additional aggregates 37.

The shifting elements used can be designed as powershift clutches or brakes. In particular, friction-locked clutches or brakes, such as multi-disk clutches, band brakes and/or cone clutches can be used. In addition, friction-locked brakes and/or clutches, like synchronizations or claw clutches, may also be used as shifting elements. According to the present invention, the shifting elements can be actuated hydraulically, pneumatically or by means of an electric motor.

Figure 12:
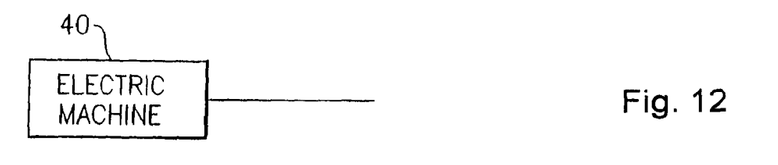
FIG. 12 A schematic view of the transmission according to FIG. 1 with and electric machine arranged on a shaft.
Figure 13:
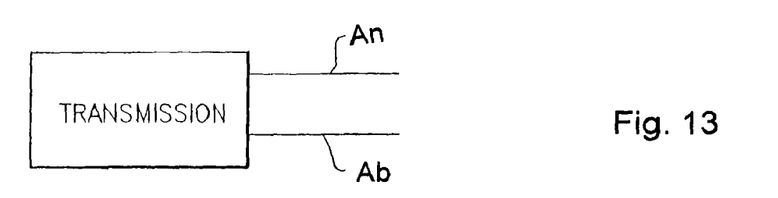
FIG. 13 A schematic view of the transmission according to FIG. 1 with a drive input and a drive output arranged on a common side of the transmission.

A further advantage of the present multi-stage transmission, as shown in FIG. 12, is that an electric machine 40 can additionally be installed on each shaft as a generator and/or additional drive machine. As shown in FIG. 13, the input element An and the output element Ab are provided on the same side of the housing.

Of course, any constructive embodiment, particularly any spatial arrangement of the planetary gear sets and shifting elements as such and in relation to one another, to the extent that it is technically expedient, falls under the scope of protection of the present claims without influencing the function of the transmission as described in the claims, even if these embodiments are not explicitly illustrated in the figures or mentioned in the description.

REFERENCE NUMERALS

0 Shaft
1 Shaft
2 Shaft
3 Shaft
4 Shaft
5 Shaft
6 Shaft
03 Brake
04 Brake
13 Clutch
14 Clutch
15 Clutch
35 Clutch
36 Clutch
46 Clutch
P1 Planetary gear set
P2 Planetary gear set
P3 Planetary gear set
An Input shaft
Ab Output shaft
i Ratio
phi Progressive ratio
G Housing

The invention claimed is:

1. A multi-speed automatic transmission of a planetary design for a motor vehicle, the transmission comprising:
   an input element (An) and an output element (Ab);
   first, second and third planetary gear sets (P1, P2, P3) and each of the first, the second and the third planetary gear sets (P1, P2, P3) comprising a sun gear, a carrier and a ring gear;
   at least first, second, third, fourth, fifth and sixth rotatable shafts (1, 2, 3, 4, 5, 6), as well as at least six shifting elements (03, 04, 13, 14, 15, 35, 36, 46) comprising first and second brakes (03, 04) and first, second, third and fourth clutches (13, 14, 15, 35, 36, 46) whose selective engagement forms different gear ratios between the input element (An) and the output element (Ab) such that at least six forward gears and three reverse gears can be implemented;
   the first shaft (1) being coupled to the input element (An) and the sun gear of the second planetary gear set (P2);
   the second shaft (2) being coupled to the output element (Ab) and the ring gear of the third planetary gear set (P3);
   the third shaft (3) being coupled to the ring gear of the second planetary gear set (P2);
   the fourth shaft (4) being coupled to the carrier of the third planetary gear set (P3);
   the fifth shaft (5) being coupled to the ring gear of the first planetary gear set (P1), the carrier of the second planetary gear set (P2) and the sun gear of the third planetary gear set (P3);
   the sixth shaft (6) being coupled to the carrier of the first planetary gear set (P1);
   the sun gear of the first planetary gear set (P1) being non-rotatably coupled to a transmission housing (G);
   the third shaft (3) being non-rotatably coupled, via the first brake (03), to the transmission housing (G);
   the fourth shaft (4) being non-rotatably coupled, via the second brake (04), to the transmission housing (g);
   the first clutch (14) detachably coupling the first shaft (1) to the fourth shaft (4);
   the second clutch (36) detachably coupling the third shaft (3) to the sixth shaft (6);
   the third clutch (46) detachably coupling the fourth shaft (4) to the sixth shaft (6); and
   the fourth clutch (35, 13, 15) detachably coupling one of the third shaft (3) to the fifth shaft (5), the first shaft (1) to the third shaft (3), or the first shaft (1) to the fifth shaft (5).

2. The multi-speed transmission according to claim 1, wherein the first, the second and the third planetary gear sets (P1, P2, P3) are coaxially aligned and sequentially arranged in an order of:
   the first planetary gear set (P1), the second planetary gearset (P2) and the third planetary gearset (P3).

3. The multi-speed transmission according to claim 1, wherein the first, the second and the third planetary gear sets (P1, P2, P3) are each minus planetary gear sets.

4. The multi-speed transmission according to claim 1, wherein an outer disk carrier of the third clutch (46) is located radially outward of the second clutch (36), the first brake (03) and the fourth clutch (35).

5. The multi-speed transmission according to claim 1, wherein
   a first forward gear is implemented by engagement of the first brake (03) and the third clutch (46);
   a second forward gear is implemented by engagement of the second clutch (36) and the third clutch (46);

a third forward gear is implemented by engagement of the third clutch (46) and the fourth clutch (35, 13, 15);

a fourth forward gear is implemented by engagement of the first clutch (14) and the third clutch (46);

a fifth forward gear is implemented by engagement of the first clutch (14) and the fourth clutch (35, 13, 15); and a sixth forward gear is implemented by engagement of the first clutch (14) and the second clutch (36).

6. The multi-speed transmission according to claim 5, wherein a seventh forward gear is implemented by engagement of the first brake (03) and the first clutch (14).

7. The multi-speed transmission according to claim 1, wherein a first reverse gear is implemented by engagement of the first brake (03) and the second brake (04), a second reverse gear is implemented by engagement of the second brake (04) and the second clutch (36), and a third reverse gear is implemented by engagement of the second brake (04) and the fourth clutch (35, 13, 15).

8. The multi-speed transmission according to claim 1, wherein a freewheel is located between at least one of the first, the second, the third, the fourth, the fifth and the sixth shafts (1, 2, 3, 4, 5, 6) and at least another of the first, the second, the third, the fourth, the fifth, the sixth shafts (1, 2, 3, 4, 5, 6) and the transmission housing (G).

9. The multi-speed transmission according to claim 1, wherein the input element (An) and the output element (Ab) are located on a common side of the transmission housing (G).

10. The multi-speed transmission according to claim 1, wherein at least one of a differential and a transfer differential is located on one of the input element (An) and the output element (Ab).

11. The multi-speed transmission according to claim 1, wherein coupling element separates the input element (An) from a drive engine.

12. The multi-speed transmission according to claim 11, wherein the coupling element is one of a hydrodynamic converter, hydraulic clutch, dry starting clutch, wet starting clutch, magnetic powder clutch or centrifugal clutch.

13. The multi-speed transmission according to claim 11, wherein an external starting element is arranged, in a direction of force flow, downstream of the transmission, and the input element (An) is fixed to a crankshaft of an engine.

14. The multi-speed transmission according to claim 1, wherein the transmission is started by a starting element (03), and the input element (An) is fixed to a crankshaft of an engine.

15. The multi-speed transmission according to claim 1, wherein a torsion vibration damper is located between a drive engine and the transmission.

16. The multi-speed transmission according to claim 1, wherein a wear-free brake is located on at least one of the first, the second, the third, the fourth, the fifth and the sixth shafts (1, 2, 3, 4, 5, 6).

17. The multi-speed transmission according to claim 1, wherein an auxiliary drive system is located on at least one of the first, the second, the third, the fourth, the fifth and the sixth shafts (1, 2, 3, 4, 5, 6) and drives at least one additional aggregate.

18. The multi-speed transmission according to claim 1, wherein the starting element is either one of a clutch and a brake.

19. The multi-speed transmission according to claim 18, wherein the first, the second, the third, and the fourth clutches are each one of a multi-disk clutch, a band brake or a cone clutch.

20. The multi-speed transmission according to claim 1, wherein each of the at least six shifting elements is one of an interlocking brake and an interlocking clutch.

21. The multi-speed transmission according to claim 1, wherein an electric machine is located on at least one of the first, the second, the third, the fourth, the fifth and the sixth shafts (1, 2, 3, 4, 5, 6) and is at least one of a generator and an additional drive machine.

* * * * *